INVENTOR
Ross W. Teeguarden

Aug. 8, 1967  R. W. TEEGUARDEN  3,334,399
BRAZED LAMINATED CONSTRUCTION AND METHOD OF FABRICATION THEREOF
Filed Dec. 31, 1962  2 Sheets-Sheet 2

INVENTOR
Ross W. Teeguarden

By A. G. Douras
Attorney

United States Patent Office 3,334,399
Patented Aug. 8, 1967

3,334,399
BRAZED LAMINATED CONSTRUCTION AND
METHOD OF FABRICATION THEREOF
Ross W. Teeguarden, Indianapolis, Ind., assignor to
Stewart-Warner Corporation, Chicago, Ill., a corporation of Virginia
Filed Dec. 31, 1962, Ser. No. 248,742
6 Claims. (Cl. 29—157.3)

This invention relates to a brazed laminated design, and more particularly, to a laminated construction and method of fabrication thereof particularly useful in the brazed heat exchanger art.

As is well known, heat exchangers are commonly used to interchange the heat content of two or more separated fluids conveyed through separate flow passages proximate each other between separate fluid inlet and outlet connections. Various states of fluids are used, such as liquid to liquid, liquid to gas, gas to gas, or any combination of these. For highly efficient light weight heat exchangers, particularly for use with fluids under high pressures, the heat exchanger at least to the extent of its core is of aluminum and is brazed.

Conventional brazed heat exchangers follow the plate and fin construction where the heat exchanger core consists of separate generally criss-cross passages for the two fluids separated from each other by thin metal plates. The various fluid passages between each of the separator plates or the confining edge of the core generally are formed by spacer bars sandwiched between the adjacent plates and brazed thereto. Fin elements to increase the heat transfer effect commonly are positioned between the spacer bars and separator plates in the defined flow passages. The stacked separator plates, spacer bars and fin elements are then brazed into a rigid core assembly. Various collectors or manifolds for the inlet and outlet fluid connections are then welded to the core assembly together with the required flanges, mounting brackets or valve housings, etc. Thus, conventionally the heat exchanger consists of a brazed core assembly, with all or most other external parts being attached to the assembly by welding after brazing.

A common defect of this conventional construction including the stacked separator plates, spacer bars and fin elements of the core, is that before brazing there is no positive fixture of the various components relative to one another. This, of course, increases the cost of preassembly because of the extreme care that must be taken and because of the utter helplessness after a partially completed assembly is knocked out of kilter. The man hour output consequently is generally low.

Concerned with the separate components including the separator plates, spacer bars and fin elements, is the construction of the various torturous flow paths through the heat exchanger. Thus, for particular heat exchangers it might be desirable to have a multi-pass flow arrangement which requires that the fluid be turned around after one pass the length of the spaced plates. This by necessity requires an obstruction, generally formed in the conventional practice by additional spacer bars to define the flow passage and additional fin elements to maintain flow continuity. These extra parts, as has already been noted, extremely handicap rapid fabrication of the unit, particularly since commonly there is no positive location of them relative to one another.

With regard to the subsequent securing by welding of the external connections to the brazed core, it is noted that welding to a brazed aluminum structure is a marginal operation. Thus, since warping or corrosion of the aluminum brazed core can commonly occur or the heat of weld can destroy the braze, extra caution is required. Additionally, this separate welding and the necessary external finishing thereof are expensive to increase the cost of the end product.

One additional concern common in heat exchanger construction and use is the deformation and possible ultimate failure of the fluid confining walls, particularly when confining fluid under high pressure. Conventionally separate tie rods are secured between opposing walls defining the fluid passage so as to prevent undue deformation of each wall and thus increase its pressure capacity. This procedure requires additional parts and the separate fixturing or fabricating thereof, which additionally increases the cost of the assembly.

Accordingly, a general object of this invention is to provide a new and improved laminated construction and method of fabrication thereof which by its inherent design minimizes or completely eliminates most of the defects presently incurred in conventional brazed construction.

Another object of this invention is to provide an improved laminated construction and method of fabrication thereof comprising a plurality of separate plates each having therein a particular combination or lack of intermediate or edge openings, and each being stacked on one another in direct abutting contact so that the various openings of at least some of the plates align and are closed by other plates to provide a continuous flow passage between inlet and outlet fluid connections.

Another object of this invention is to provide an improved laminated construction and method of fabrication thereof wherein the various laminations are fabricated from thin flat stock by a punching operation and wherein as such different sizes, shapes and opening combinations are quickly, accurately and economically possible.

Another object of this invention is to provide an improved laminated construction and method of fabrication thereof which inherently provides with a minimum inventory of separate components a wide choice of brazed assemblies having varying styles, sizes, and capacities and wherein the separate components can be interchanged before brazing to provide for minor variations with little extra effort or expense.

A more specific object of this invention is to provide an improved laminated construction and method of fabrication thereof of a heat exchanger which provides for internal manifolding of one or both of the separate fluids, offers positive location and mechanical securing of the separate components before and independently of brazing, offers a readily changeable almost unlimited flow path choice inherent in the design, provides for ready localized strengthening of the pressure confining wall structure as required, and provides for direct external connection to the respective fluid sources or the like and for mechanical securing of the finished assembly with little or no external welding or subsequent fabrication after brazing.

These and other objects will be more fully appreciated upon a complete disclosure given in the following specification including as a part thereof the accompanying drawings, wherein.

Figure 3:
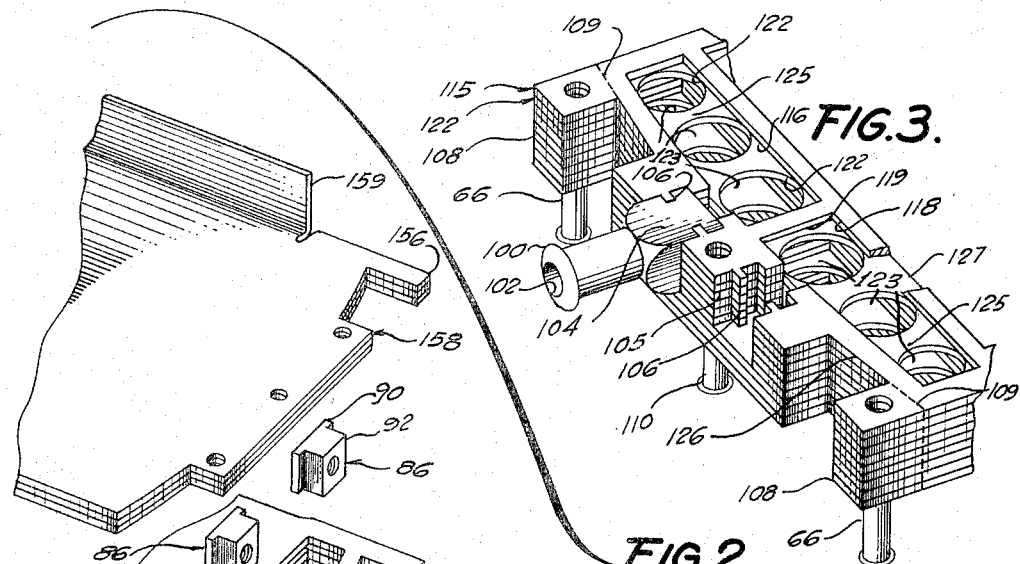
Figure 4:
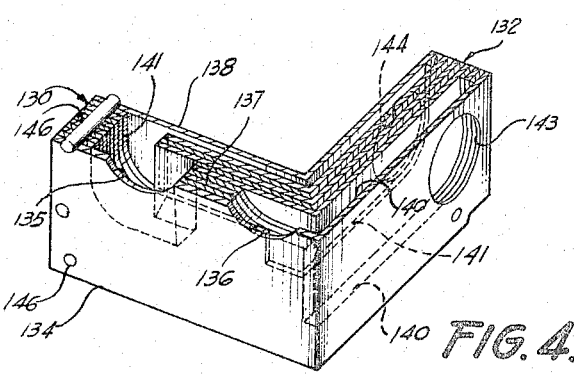

FIG. 3 is a perspective view of a manifold collector of a heat exchanger fabricated in accordance with the principles of the subject invention showing specifically therein local strengthening of the fluid confining walls, and the positive interlock of inlet and outlet fluid connection means to the manifold; and FIG. 4 is a perspective view cut away and in section of structure fabricated in accordance with the principles of the subject invention applicable for manifolding fluid and for conveying the fluid therein through flow passages at various angles relative to one another.

Generally, the subject invention includes a plurality of separate plates or sheets of metal stacked in direct contact with one another. Each of the plates has therein a particular combination or lack thereof of openings which line up with corresponding openings or are closed by the solid portion of the adjacent plates. The various plates when stacked in intimate contact with one another thereby define through the various aligned and intercommunicated openings flow passages for the respective fluids. The plates are stacked on one another over interlocking means such as a plurality of tubes or pins received within various other aligned openings in each of the plates.

Figure 1:
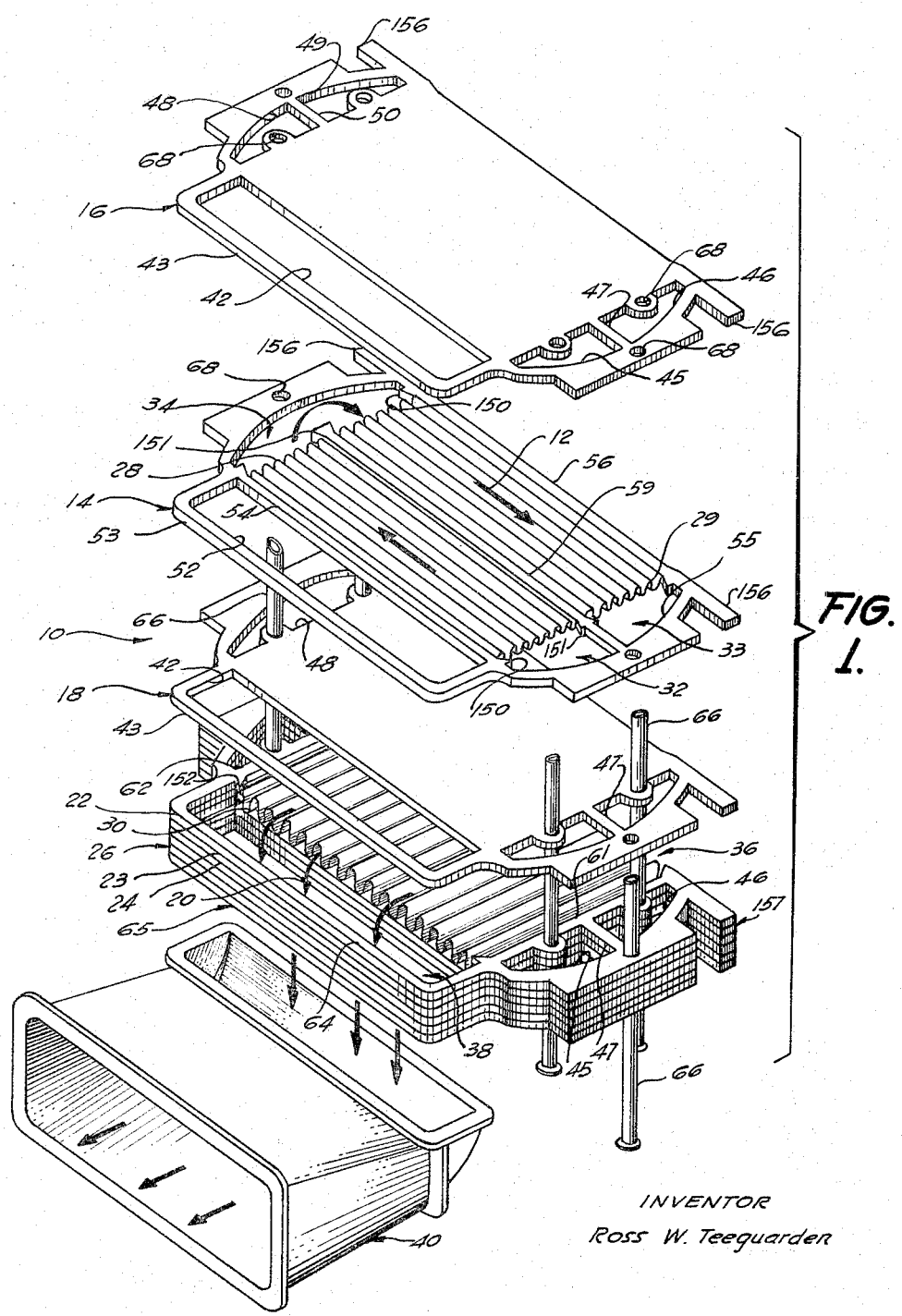
FIG. 1 is an exploded perspective view of two passes of a heat exchanger incorporating therein the principles of the subject invention.

FIG. 1 shows two passes of a heat exchanger 10 having typical cross flow paths for a gas-liquid interchanger such as for air and oil. One oil passage 12 is defined within a center opening of a web or plate 14 sandwiched between plates 16 and 18. One header or air passage 20 is shown as defined within edge openings of stacked plates 22, 23 and 24 sandwiched between plate 18 and plate 26. Oil fins 28 and 29 and an air fin 30 are positioned within the respective fluid passage for producing greater heat transfer as is well known. In the heat exchanger shown the oil path 12 is collected in internal inlet and outlet headers or collector manifolds 32 and 33, respectively (another example of which is shown in greater detail in FIG. 2) and turned around in internal collector manifold 34. The air passages 20 have a common open inlet 36 adapted to be mounted for impact in an air stream by means of appropriate flange connections, for example, and have an internal outlet collector manifold 38 for common discharge through conduit 40. The various plates and fin elements are stacked on one another in a systematic manner so that, if desired, any number of fluid passes or separate layers of oil or air passages in the heat exchanger are possible.

Plates 16 and 18 are substantially identical separator plates interposed directly between the oil passage 12 and the adjacent air passages 20. An intermediate passageway or opening 42 surrounded entirely by land area including that of edge strip 43 and the main body portions of the plate is formed in each of the plates 16 and 18 and used when the plates are stacked to form the internal outlet collector manifold 38 for the air passages 20. A pair of intermediate passageways or openings 45 and 46 separated by strip 47 and a pair of intermediate passageways or openings 48 and 49 separated by strip 50, are also formed in the plates 16 and 18 to be used for the integral oil collector manifolds 32, 33 and 34, previously noted.

The plate 14 has provided therein a passageway or an opening 52 surrounded entirely by land area including that of the edge strips 53 and 54 which line up and cooperate with the corresponding opening 42 and land area of the adjacent plates 16 and 18. A heat exchange space or opening 55 is formed in the closed configuration web or plate 14 surrounded by the adjacent edge strips 54 and 56 and partially divided by an intermediate strip 59 extending partially across the opening. The exterior confines of the opening 55 are generally complementary to the openings 45, 46, 48 and 49 presented in the adjacent plates 16 and 18, while the land areas defined by edge strips 54 and 56 abut the main body portion of the plates 16 and 18. Thus abutment of the plates 14, 16 and 18 closes the opening 55 except for communication with the overlapping openings 45, 46, 48 and 49 to define the necessary confinements for oil passage 12.

The oil fins 28 and 29 positioned within opening 55 extend only partially the length thereof generally to the adjacent edges of the openings 45, 46, 48 and 49 on the sandwiching plates 16 and 18. The separator strip 59, abutting the separator strips 47 of plates 16 and 18, prevents a cross flow or short circuit between the oil inlet and outlet manifolds 32 and 33 respectively, defined within the aligned openings 45 and 46 of plates 16 and 18 and the opening 55 of plate 14 beyond the oil fins 28 and 29. Instead, the oil from inlet manifold collector 32 is conveyed between separated strips 54 and 59 to the oil manifold collector turn around 34 and returned between the separated strips 59 and 56 to oil outlet manifold collector 33. Each of the air passage plates 22, 23 and 24 has oil manifold opening arrangements similar to the separator plate 16 or 18, including the openings 45, 46, 48 and 49 surrounded by the appropriate land area formed by edge strips 61 and 62 and intermediate strips 47 and 50. Thus the defined inlet, outlet and turn around oil manifolds are continued to the separate oil passes as desired.

The air passage 20 is confined within webs or plates 22, 23 and 24 sandwiched between the closed separator plates 18 and 26. Each of plates 22, 23 and 24 is generally U-shaped to form a heat exchanger space having an inner periphery defined by the edge strips 61 and 62, and by edge strip 64. All land areas of the plates 22, 23 and 24 as defined by the strips 61, 62 and 64 complement and abut the adjacent land areas on the adjacent plates 18 and 26 so as to maintain closed the defined integral outlet air collector manifold 38 through the aligned openings 42 and 52. The air fin 30, as shown, only extends generally to the inner edges of the openings 42 of the plates 18 and 26. The internal air outlet manifold collector 38, similar to the oil collectors, can operate for any number of separate air passes.

It will be apparent that provision must be made in the top and bottom plates of the unit to close off the various internal manifolds. In FIG. 1, for example, the lower plate 65 is provided with an air outlet manifold opening in alignment with openings 42 and 52 of plates 16, 18 and 26. The air outlets from the air passages 20 are then funneled through the conduit 40 as desired. However, there is no oil manifold opening arrangement in the plate 65, effective thereby to cover the openings 45, 46, 48 and 49 so as to close off the oil manifold collectors. A top plate (not shown) can be identical to the bottom plate 65, or can be solid to close off both the air and oil manifold collections.

As shown in FIG. 1, spaced pins or positioning members 66 are received within various aligned openings 68 of each of the plates to position the plates properly and to hold the plates secured relative to one another during assembly. Each of the plates has its pin receiving opening, or openings 68 at predetermined locations relative to the various other fluid passage openings or fluid confining land areas and are aligned only when the latter are properly coordinated. Thus, the heat exchanger can be fabricated quickly and accurately by means of systematically stacking the various plates over the pins 66 until the proper combination of openings and land areas align to define the torturous flow passages illustrated by the oil passage 12 and the air passage 20. The pins 66 not only accurately position the plates relative to one another, but also retain the plates mechanically secured until actual brazing of the assembly.

To assemble the heat exchanger, the pins 66 typically would be fixtured at the proper center spacing. The plates would then be sequentially positioned over the pins, and the fin element positioned in the proper defined flow passage. Thus lower plate 65 would be positioned first over the pins 66, and followed in turn by the plates 26, 24, 23 and 22, and the air fin element 30. The plates 18 and 14, the oil fins 28 and 29, and plate 16 would be then positioned, and the sequence continued as desired until the top plate. The pins 66 could be crimped over then to secure the assembly mechanically until actual brazing.

It would be obvious if it were desired to vary the aligned opening arrangement to vary the flow paths through the heat exchanger. Thus, for a single pass oil passage 12 instead of the double pass passage shown, the center strip 59 of plate 14 can be eliminated. The outlet of the oil could be provided in the manifold collector 34. Alternatively, various oil manifold opening arrangements in the air passage plates 22, 23 or 24 could be closed entirely to form criss-cross oil passages in series throughout the height of the heat exchanger. In brief, almost an unlimited flow passage design is possible with various combinations of stacked prepunched plates.

Figure 2:
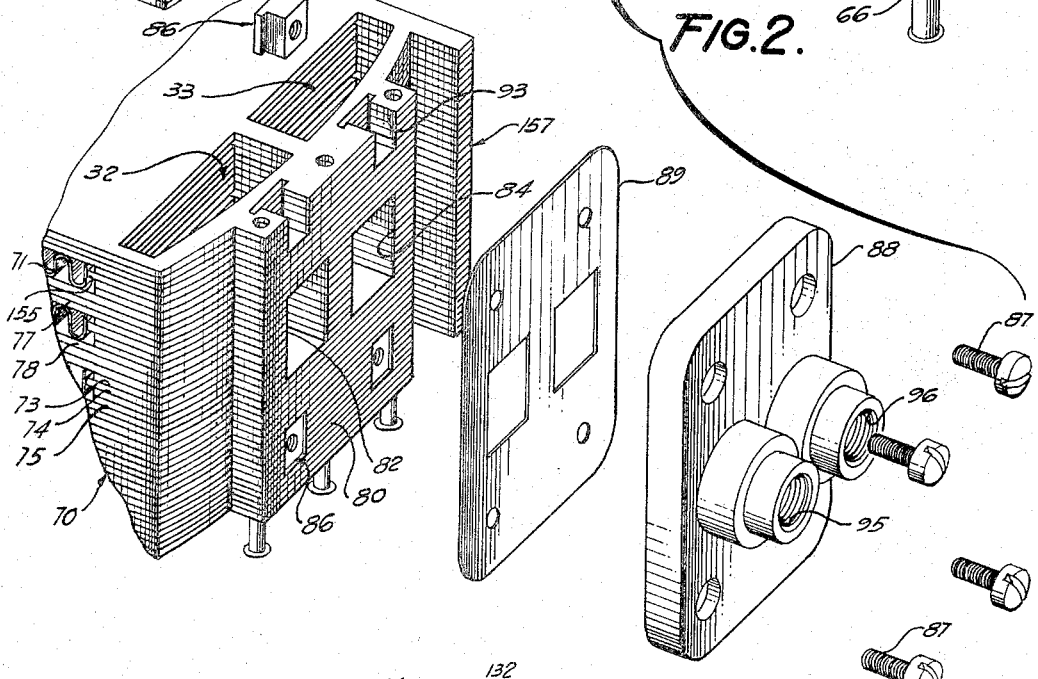
FIG. 2 is an exploded perspective view of a heat exchanger fabricated in accordance with the principles of the subject invention showing specifically therein external valve seat means and external connection means formed as an integral part of the assembly for ready cooperation with and connection to secondary dependent structures.

The heat exchanger 70 of FIG. 2 is an air-oil interchange, similar to that of FIG. 1, except that the air is discharged directly from outlet 71, and not through the internal manifold 38. As such, it will be noted that the air passage is defined by separate plates 73, 74 and 75 at both ends of the exchanger which act only to space the adjacent separator plates 77 and 78, and to define the oil manifold collectors.

A typical fluid inlet and outlet connection in accordance with the principles of this invention is shown in the heat exchanger 70 of FIG. 2. The exterior of the stacked plates adjacent the oil manifold collectors defines a generally flat surface 80. Various of the stacked plates are provided with edge openings 82 and 84 through the land area to the defined manifold collectors. The openings 82 and 84 can be as shown at 105 in FIG. 3 except that, if desired, the shoulders shown thereon can be eliminated. As such, a direct communication is established to the separate inlet and outlet fluid collectors through the openings 82 and 84.

Spaced locking elements or threaded nut assemblies 86 are positioned around the openings 82 and 84 adapted for connection with complementary bolt members 87 for securing a dependent housing 88 and an interposed gasket 89 to the valve seat 80. Each nut 86 includes flanges 90 projecting from a generally rectangular body portion 92 adapted to be received within a correspondingly shaped recess or notched edge opening 93 presented in the various adjacent stacked plates for establishing a mechanically secure connection with the assembly. The flange 90 engages behind a shoulder in each of the aligned recesses 93, which form a locking element passageway to prevent separation of the locking element from the heat exchanger. The nuts can be formed of a hardened steel, so that under normal brazing techniques for aluminum, they will not be brazed or affected by the brazing operation. The number of adjacent plates required to be notched for openings 93 depends on the breadth of the nut 86.

As shown the housing 88 has two threaded openings 95 and 96 which are aligned with the through-openings 82 and 84 of the valve seat for ultimate exterior communication with the fluid manifold collectors. If necessary the valve surface 80 can be machined flat or true after brazing so as to form a better seal, but all welding after brazing is eliminated.

FIG. 3 shows a similar fluid manifold collector having external communication with no fabrication or welding after brazing of the structure. The manifold connection includes a tube member 100 having a through-bore 102 and an integral locking element formed by a notched body portion 104. The notched body portion 104 is received with edge through-opening 105 and forms an interlock with the shoulders 106 thereon. It has been found that by using a tube 100 of material similar to that being brazed, such as commonly of aluminum, the tube 100 will braze true to the adjacent plates to form a seal. The interlocking shoulders 106 and notched body 104 secure the terminal tube mechanically, however, to prevent dislodging even if subjected to a thrust.

Although nuts 86 of FIG. 2 and tube 100 of FIG. 3 are each shown at the edge of the stacked plates, by appropriately sizing aligned openings in the stacked plates either component could be located at the surface of plate 159 (FIG. 2) for example with the locking flange or shoulder extending parallel to the plates and retained by one or more of the adjacent plates.

FIG. 3 also shows the location of the guide pins 66 externally of the confining fluid chambers on tabs 108. Thus, it is possible after the assembly is brazed in an integral fashion to shear the tabs 108 as indicated along dotted line 109 to minimize the weight of the finished assembly. If required the guide pin 110 can similarly be repositioned to an exterior location so that it too can be eliminated if weight of the finished product is critical.

FIG. 3 also shows the local strengthening provision inherent in and readily practiced by the subject invention. The figure shows a typical fluid manifold collector as defined by a plurality of stacked plates. The plate 115 is provided with two openings 116 and 118 separated by center strip 119 each adapted to define the inlet and outlet fluid collector as noted in FIG. 2. The plate 122 instead of having the two openings as shown in plate 115 has six spaced openings 123 each separated by land area or rib 125 between the outer confining land areas 126 and 127 of the plate. The ribs 125 interconnecting the opposing land areas 126 and 127 offer inherent strength to resist expansion of the pressure confining walls defined at the land areas of the stacked plates. The spacing of the ribs on each strengthening plate and the frequency of stacked plates having the ribs can be determined as required, such as a two-rib plate every fourth or fifth stacked normal plate. The strengthening plate 122 provides the continuous communication as required between the collector manifold but still offers added local strength required. This eliminates the separate tie rods previously used. Since the strengthening plate 122 is stamped in an identical manner as any other plate, no special tooling is required so that the cost is comparable. Also, since each strengthening rib is integral with the plate itself there is no positioning or securing problem before brazing or separate fabrication required after brazing.

FIG. 4 shows the principles of the subject invention applied in an assembly operable to provide internal fluid communication around a corner within various intermediate openings of stacked plates. The stacked plates, as shown present leg portion 130 and leg portion 132 extending at a sharp angle therefrom. The various aligned openings within the stacked plates provide for separate and continuous internal flow passages. Plate 134 could, for example, be used as a top or bottom plate over the oil manifold collectors of FIGS. 1, 2 or 3, with spaced openings 135 and 136 on leg 130 having separate communication with the defined inlet and outlet collectors. The adjacent stacked plates have various openings aligned with the openings 135 and 136 but separated by land area 137 and ultimately closed by plate 138 to maintain separated passages 140 and 141. The separated passages 140 and 141 extend around the corner to leg 132 to the separate openings 143 and 144 in respectively the plates 134 and 138. The positioning pins 146 retain the stacked plates secure before brazing. It will be noted that each of the stacked plates defining the subject assembly is integral and bent to the angle required. Obviously, both the angle of bend of leg 132 relative to leg 130 and the plane of leg 132 relative to the normal plane through the openings 135 and 136 can be varied.

As noted the principles of the subject invention can be readily and economically practiced, since all of the separate components of the assembly are economically fabricated from simple flat stock and are mechanically positioned relative to one another by means of interlocking pins. In this regard, by appropriate projections or notches on the plates defining the flow passages which receive the various fin elements, it is possible to mechanically position the fin element relative to the receiving plates. In FIG. 1, projections 150 and 151 presented in plate 14 confine or locate the fin elements 28 and 29 while slight inward projections 152 on the plates 22 and 24 confines or locates the fin element 30.

It is also possible by means of the principles of the subject invention to maintain the normal flush portions of the fin elements spaced from the wall structure of the flow passage by permitting at least one of the stacked plates to project a short distance beyond the normal contour. This is shown in FIG. 2 where the center air plate 74 confining the fin element 30 is extended as at 155 a slight distance past the defined outline of the adjacent plates 73 and 75. Thus the fin element 30 contacts only that portion 155 of plate 74 while the remainder of the fin element is spaced from plates 73 and 75 to provide for ready flushing of flux from the assembly.

It will be noted also in FIGS. 1 and 2 that an exterior projection 156 on the plates operates when combined with a like projection on the adjacent stacked plates as a flange 157 for ready connection of the assembly to a dependent structure. The flange 157 can be drilled as required to provide for positive connection means without welding after brazing. If only local tabs were required for local mountings, the remainder of the flange as shown could obviously be omitted.

Similarly, the top and bottom plates (as shown on top plate 158 in FIG. 2) can be provided with an upturned portion 159 to provide a flange for ready connection of the heat exchanger to some exterior structure. An annular seal around the inlet air stream also can be defined between the flanged heat exchanger and the supporting structure. If strength requires a heavier flange, a separate bar could be secured, such as by riveting, to the plate at the upturn 159, or similar upturns of two or more plates could be combined.

It is thus noted the entire heat exchanger with the collectors, flanges, mounting brackets, etc. consists entirely of piece parts which are stacked in proper sequence on one another and mechanically positioned by means of the guide pins. This integral structure before brazing greatly facilitates fabrication and eliminates the many common defects of moving or drifting parts. Also, since the fluid manifold collectors are internal of the heat exchanger assembly itself the entire heat exchanger is one integral brazed unit. This greatly facilitates economical construction since the expense and problems of subsequent welding are eliminated. This all brazed assembly also is more durable than the normal separate brazed core and welded external collectors since it has the added inherent strength of an integral structure. The invention has particular utility with the use of clad sheets or plates, as are well known, where the brazing compound is formed as a layer on one or both sides of each plate.

While the subject invention has been shown basically for application with a heat exchanger, such a laminated design in accordance with the principles of this invention can be readily applied in other areas of brazed hollow structures. Thus valve housings, even to the extent of providing replaceable valve seats for varying capacities or replacement, are entirely within the concepts herein disclosed. Accordingly, it is desired that the invention not be limited by the specific disclosure shown but only by the scope of the claims hereinafter following.

What is claimed is:

1. In the method of fabricating a heat exchanger wherein a plurality of plates and webs are stacked successively to form heat exchanger spaces individual to a respective fluid for exchanging heat between two fluids, the method comprising providing a suitable intermediate opening in each of said plates and webs for conducting each fluid, an edge recess in certain of said plates and webs with each recess having a shoulder therein, stacking said plates and webs successively with the recesses and shoulders aligned whereby said recesses provide a locking element passageway with an open end, inserting a locking element through said open end and in said locking element passageway with said locking element having a recess for engaging the shoulders of said certain plates and webs, stacking either another plate or web on said successively stacked certain plates and webs for closing the open end of said locking element passageway and preventing separation of said locking element from said heat exchanger whereby said locking element enables an external member to be attached to said heat exchanger, and brazing all of said stacked plates and webs together.

2. In the method claimed in claim 1 the step of securing a conduit to said heat exchanger by engagement with said locking element.

3. In the method claimed in claim 1 the step of providing an integrally formed conduit on said locking element.

4. In the method of fabricating a heat exchanger wherein a plurality of plates and webs are stacked successively to form heat exchanger spaces individual to a respective fluid for exchanging heat between two fluids, the method comprising providing a suitable intermediate opening in each of said plates and webs for conducting each fluid, an edge recess in certain of either said plates and/or webs with each recess having a shoulder therein, stacking either said plates and/or webs successively with the recesses and shoulders aligned whereby said recesses provide a locking element passageway with an open end, inserting a locking element through said open end and in said locking element passageway with said locking element having both a recess for engaging the shoulders of said certain plates and webs and means for securing an external member to said exchanger, stacking either another plate or web on said successively stacked certain plates and webs for closing the open end of said locking element passageway and preventing separation of said locking element from said heat exchanger whereby said locking element enables said external member to be attached to said heat exchanger, and brazing all of said stacked plates and webs together.

5. A method of fabricating a heat exchanger for two fluids comprising the steps of providing juxtaposed passageways spaced adjacent respective edges of each of a plurality of plates, providing a passageway in each of a plurality of webs for alignment with a respective one of said juxtaposed plate passageways, providing an edge recess in certain ones of said plates and webs to form a passageway for a locking element with each recess having a shoulder therein, stacking said plates with the juxtaposed edge passageways spaced adjacent respective edges in alignment, stacking said webs between successive plates for forming spaces on opposite sides of each plate with each web passageway aligned with a respective one of said juxtaposed passageways and the space on the opposite sides of each plate communicating only with a respective other one of said juxtaposed passageways, said certain plates and webs being successively stacked with each edge recess aligned to form a locking element passageway having an open end, inserting a locking element in the open end of the locking element passageway formed by the aligned edge recesses with said locking element having a recess for mating engagement with the shoulder of said recesses, stacking either another plate or web on said successively stacked certain plates and webs for closing the open end of said locking element passageway whereby said locking element is mechanically secured to said heat exchanger for in turn securing an external conduit to said heat exchanger, and brazing all of said stacked plates and webs together.

6. In the method of claim 5, the step of providing guide means on said stacked webs for positioning fin elements located in said spaces.

References Cited

UNITED STATES PATENTS

| | | | |
|---|---|---|---|
| 2,961,222 | 11/1960 | Butt | 165—166 |
| 2,974,404 | 3/1961 | Humenik | 29—157.3 |
| 3,046,639 | 7/1962 | Freyholdt | 29—157.3 |
| 3,079,994 | 3/1963 | Kuehl | 165—166 |
| 3,098,522 | 7/1963 | McCormick | 165—166 |

FOREIGN PATENTS

| | | |
|---|---|---|
| 216,789 | 12/1909 | Germany. |
| 691,967 | 5/1953 | Great Britain. |

JOHN F. CAMPBELL, *Primary Examiner.*

CHARLES SUKALO, *Examiner.*

S. W. MILLARD, J. D. HOBART, *Assistant Examiners.*